United States Patent Office 3,047,411
Patented July 31, 1962

3,047,411
MAGNESIA GUNNING MIXES
Lewis W. Chantler and William O. Hund, Charles Town, W. Va., assignors, by mesne assignments, to Martin-Marietta Corporation, Chicago, Ill., a corporation of Maryland
No Drawing. Filed May 1, 1959, Ser. No. 810,221
17 Claims. (Cl. 106—81)

This invention relates to refractory compositions. More particularly, it relates to magnesia or magnesia-chrome refractories useful in the repair of refractory furnace linings. Still more particularly, it relates to so-called gunning mixes, a mixture of refractory materials which is suitable for spraying from a gun such as a nozzle mix air gun and a process of bonding dead-burned magnesia.

Granular magnesia and/or chrome refractories have been commonly made with various binders such as sodium silicate for various applications wherein the mix is compacted into position by pneumatic tampers or large hammers. These refractory materials, when tempered with water, will exhibit a certain so-called green strength during the forming period even though the full strength of the bond is not developed until after the composition has been fired.

It has been suggested that magnesia refractories utilizing phosphorous bearing compounds as binders such as alkali metal phospho-aluminate plus trisodium phosphate, give good tamping characteristics and high strength. Such refractories have very limited use. In operations such as steel manufacture, every effort is made to eliminate phosphorous and phosphorous bearing compounds because of the deleterious effects of even very small quantities of phosphorous. Presence of phosphorous-bearing compounds in a furnace lining therefore is not acceptable because of contamination of the molten products due to the phosphorous compounds being slowly extracted from the lining or any surface coatings deposited thereon.

Furnace linings produced by tamping methods often show localized deterioration after a period of use at such areas as the slag line. To make quick localized repairs and to arrest the deterioration of the lining, refractory compositions known as gunning mixes are deposited on the hot or cold walls of a lined furnace.

Gunning mixes in addition to being free of phosphorous-bearing materials must exhibit properties rendering them entirely distince from other refractory compositions. Gunning mixes must possess among other properties, quick wettability, water tolerance and adhesiveness. Lack of adherence when the material is projected against a hot or cold wall has been the most frequent deficiency of refractory mixes particularly when attempts were made to adapt ramming or tamping mixes to the gunning operation. Formulation of magnesia gunning mixes is further complicated because of the lack of natural cohesiveness of dead-burned magnesia granules and because attempts to improve a specific property frequently result in accentuating defects in other properties and even the development of new and undesirable properties.

If the failure of the gunning mix is due to a lack of adherence, this shortcoming shows itself by the complete or partial loss of large quantities of refractory material because the material thrown on a furnace wall slumps and falls off as the thickness of the emplaced refractory increases. In the past, when attempts were made to overcome this deficiency by increasing the quantity of the binder in a refractory mix, the refractory has shown itself to have other serious disadvantages. Appreciable quantities of binder, for example, sodium silicate lessens the refractoriness of the composition to an undesirable degree, lowers the strength of the material after heating or firing, interferes with the formation of dense, non-porous coatings and increases the clogging difficulties experienced with the spray guns.

When an attempt is made to improve the gunning mixes by adding a sufficient amount of plasticizing agents such as starch, ball clay, etc., to dead-burned or partially burned mangesias, it has been found that the resultant structure is weak and lacks refractoriness to an undesirable degree due to hte presence of excessive impurities added as part of the plasticizing agent.

Further important and related problems encountered with prior materials is the wettability of the mixtures and the water tolerance. In many attempts to decrease the loss of materials due to lack of adhesion or "rebound," the amount of water added in the spray nozzle was increased. Magnesia refractories and/or chrome ore mixture, etc., exhibit limited absorption or adsorption of water and the mixtures with increased water content deposited on, for example, a vertical wall of a furnace tended to be so soupy as to run and not hold its shape. Wetting of the binder to activate it in the short time between mixing the dry refractory composition with water and deposition of the mixture on a wall is at least a part of this problem. A gunning mix must tolerate sufficient water to activate the binders. Some materials such as starch and gums are excellent binders if sufficient time is provided for wetting, dissolving or dispersing. In the short time between wetting and deposit of the refractory mixture, the slow wetting binders are a hindrance since they act almost like an inert granule. Sodium silicate is a binder which wets quickly if sufficient water can be added without causing slumping.

In accordance with the present invention, adhesion, wettability and water tolerance which are normally absent, may be imparted to magnesia and/or chrome refractories without deleteriously affecting the high temperature refractoriness.

Broadly stated, the invention involves a mixture of refractory materials with a combination of binders wherein the desirable properties are attributable to the mixed or combined relationship of the ingredients and to the method of producing a refractory from said mixture of ingredients.

The improved refractory gunning mix comprises refractory materials which it is commonly desired to make up for applying to furnace lining. The materials used may be dead-burned magnesite and a binder mixture consisting of alkali metal silicate and a rapidly water soluble cellulose carboxyether, such as carboxymethylcellulose or higher homologues thereof or the water soluble salts thereof. In adapting the refractory materials to specific use, the refractory may contain a chromium bearing material such as chrome ore, calcined chrome ore crushed to desired size or chromium binder material.

In a typical gunning mix the bulk of the refractory or at least a large proportion is dead-burned magnesia clinker comminuted to a relatively course mesh as for instance to a particle size which will pass a ⅛ inch screen and be retained on a No. 30 U.S. Standard screen. The magnesite which is empolyed can be any high purity dead-burned magnesia obtained by calcining high grade natural ores such as magnesite or brucite, or it can be obtained by calcining any magnesium compound which yields magnesium oxide upon calcination. The magnesia can be obtained, for instance, by recovering magnesium chloride from potash solutions and heating the magnesium chloride under conditions to evolve hydrochloric acid and produce magnesium oxide. This MgO product, with or without compounding with materials such as talc is calcined to produce dead-burned magnesia of 93% or higher purity. The magnesia also can be produced by calcining relatively pure magnesium hydroxide or magnesium carbonate at temperatures usually ranging from 2700–3500° F.

The magnesite is preferably employed in the dead-burned state. Chemical analysis of typical magnesias show various components in the following ranges:

| Material: | Ranges, percent |
|---|---|
| $SiO_2$ | 2.5–8 |
| $Fe_2O_3$ | 1.0–6 |
| $Al_2O_3$ | 0.5–3 |
| CaO | 1.5–6 |
| MgO | 80–95 |

When making up batches of gunning mixes, the grain or particle size of the aggregates can, if desired, be selected primarily because of area, method of emplacement and packing characteristics. Representative screen sizing of the particles may be as follows, the sizes being U.S. Standard screen sizes.

Screen sizings:

| Screen sizings | (1) | (2) | (3) | (4) |
|---|---|---|---|---|
| Percent pass: | | | | |
| ¼" | 100 | 100 | | |
| No. 4 | 94 | 97 | | |
| No. 8 | 64 | 76 | 99 | 100 |
| No. 16 | 51 | 56 | 81 | 90 |
| No. 30 | 49 | 41 | 56 | 65 |
| No. 100 | 36 | 23 | 32 | 27 |

Such products may be made by screening out various group of particle sizes and then recombining them to obtain the desired particle size curve. As many as four or five different sized products may be recombined to form a gunning mix. It is usually preferable to maintain a content of 20% to 40% of material passing a 100 mesh screen. These sizings, shown as applicable to magnesia, may also be applied to chrome ore if that is a desired component of the gunning mix.

A typical chrome ore useful for the purposes of this invention shows the following chemical analysis.

| | Percent | | Percent |
|---|---|---|---|
| $SiO_2$ | 4.8 | CaO | Traces |
| FeO | 24.3 | MgO | 11.0 |
| $Al_2O_3$ | 16.9 | $Cr_2O_3$ | 42.7 |

Chrome ore is useful in this invention in quantities up to 70% of the dry mix. When preparing gunning mixes containing chrome ore, the basic constituents i.e., the mixture of magnesia and chrome ore generally have a chemical analysis falling in the following ranges.

| | Percent |
|---|---|
| $SiO_2$ | 3.0– 8 |
| $Fe_2O_3$ | 3.0–15 |
| $Al_2O_3$ | 2.5–10 |
| CaO | 1.5– 5 |
| MgO | 40–80 |
| $Cr_2O_3$ | 0–35 |

Chromium binder materials are to be distinguished from chrome ores which are complexes of oxides, silicates, etc., of chromium, aluminum, iron, magnesia and the like. As binder, chromium compounds are used in quantities generally less than 3% by weight of the mix on a $Cr_2O_3$ basis. Chromium compounds useful as binders are, for example, chromic acid, chromium-containing salts, chromous sulphate, chromic sulphate, chromic halides, chromic-oxalate, chromates and dichromates. Chromium salts, acting as binders, calculated as $Cr_2O_3$, may constitute up to 3% by weight of the dry mix.

With the materials as aforementioned, there is added a small percentage of dry alkali metal silicate, anhydrous or hydrous. This alkali metal silicate material should be finely ground, for instance, to −20 mesh size and preferably finer and desirably all should pass through a 100 mesh screen and at least a small proportion pass through a 200 mesh screen. Ground anhydrous silicate glass or dried hydrated silicates may be employed. Mixtures of these silicates also may be used. The $Na_2O:SiO_2$ ratio in, for example, sodium silicate is not particularly critical. Material exhibiting weight ratios in the range of 1:1.5 and 1:3.5 gives satisfacotry results. About the only materially practical limitation is that higher alkaline ratios in the range between 1:3 and 1:3.5 tend to set more rapidly and if the ratio is too low it may prolong the time before adequate setting occurs.

The amount of binders which may be added necessarily varies with variation in composition. In general, quantities of silicate material added, for example, sodium silicate, will fall in the range between about 1 and about 5% by weight of the mixture and preferably between about 2.5% and 4.5%. Quantities less than about 1% by weight of sodium silicate provide too little bonding strength. Quantities in excess of about 5% show progressively lower refractoriness and tend to increase slump when wet.

Limitation of the amount of alkali metal silicate to quantities within the above set forth ranges gives a burned product having characteristics similar to those of common commercial magnesia furnace linings.

In preparing applicants' composition, there is added to and mixed with the components hereinbefore described a water-soluble cellulose carboxyether component in amounts between about 0.1% and 1%, and preferably between about 0.10% and 0.25%, which advantageously may be in the form of cold-water soluble carboxyalkyl-ether salts of monovalent cations, such as the alkali metals, sodium and potassium. Solubility of cellulose carboxyethers depends upon the degree of substitution and the nature of the alkyl group which is preferably not larger than about 3 carbon atoms. The preferred water soluble carboxyethers are, for example, carboxymethylcellulose materials in which the degree of substitution is between about 0.5 and 1.4 and which exhibit a viscosity at 25° C. and at 1% concentration of between about 1000 and about 2800 centipoises. Particularly effective carboxyether materials are the sodium and potassium salts of carboxymethylcellulose, such as is sold by Hercules Powder Co. under the trade name CMC 70 High, having a degree of substitution between 0.65 and 0.95 and a viscosity at 25° C. and at 1% concentration of between 1300 and 2200 centipoises. By cellulose carboxyether is meant a single ether or mixtures of various ethers and salts thereof.

In preparing the gunning mix compositions according to the present invention, the components are mixed together in a tumbling mill or equivalent apparatus. It is preferred to grind each component separately and to mix the comminuted materials. If desired, when the gunning mixture is to contain chromium, the magnesite and chrome ore may be ground together. On occasion, the silicate and cellulose carboxyether may be ground together.

After a dry gunning components mixture has been thoroughly mixed to a uniform mixture, the mixture has good storage stability when packaged in the commercially available moistureproof containers such as sacks, drums, etc.

Dry refractory mixture, when it is used, is delivered to a gun nozzle suspended or entrained in a moving air or gas stream. At the gun nozzle, the operator proportions the solids and water based upon the observed adherence to or "rebound" from the wall against which the stream of wetted solids is projected. The presence of the cellulose carboxyether provides the gun operator with a greater latitude on his water control than has been experienced heretofore. Magnesia type gunning mixes heretofore have given a narrow range of about ±1% for proper adherence, i.e., a range for example, 8 to 10% or 10 to 12% by weight of water. Utilizing the mixes of the instant invention, proper adherence generally may be attained over a range of water content of the wetted refractory mix of from about 8% to 15%.

A representative gunning mix for repair of magnesite furnace lining, prepared from comminuted periclase, showed a magnesia of a particle size 100% of which passed through a ⅛ inch screen and about 25% of which passed a No. 100 U.S. Standard screen.

This dead-burned magnesite possessed a particle size distribution as follows:

100% passing a ⅛ inch screen
97% passing a No. 16 screen
60% passing a No. 30 screen The magnesite material showed a chemical analysis of:

| | Percent | | Percent |
|---|---|---|---|
| $SiO_2$ | 4.8 | CaO | 4.0 |
| $Fe_2O_3$ | 2.4 | MgO | 87.5 |
| $Al_2O_3$ | 1.3 | | |

The above specified magnesia material, uniformly blended with binders may be mixed at the nozzle of a BRI gun with 8 to 15 parts by weight of water per 100 parts of dry mix composition. The stream of wetted solids, when jetted against a furnace lining, will adhere to the contact area, holds its shape, is dried almost immediately, and is fired as the furnace is brought to operating temperature.

For comparative tests, results of which are summarized in Table I, refractory materials were prepared as follows:

A gunning mix batch A and a gunning mix batch B were prepared from magnesia mixes (1) and (2) respectively, of the following compositions which differ in particle size distribution.

| Particle size | (1) | (2) |
|---|---|---|
| Pass ⅛" screen and retained on No. 16 screen | 45 | |
| Pass No. 16 screen and retained on No. 30 screen | 16 | 35 |
| Pass No. 30 screen | 35 | 61 |

To each batch was added 4% by weight of sodium silicate. The ingredients were thoroughly blended dry in a revolving blade type mixer.

Each batch was split into portions providing a control portion and a second portion which was mixed with 0.2% by weight of carboxymethylcellulose (CMC 70 High). A 300 gram sample was withdrawn from each of the portions and made into a wetted mix by the addition of 3% of water. The wetted solids were tamped into 2 inch Dietert cylinders. The cylinders upon completion of the tamping were crushed and the remains remixed with an additional amount of water. The newly wetted composition was rerammed and recrushed. The incremental addition of water, reramming and recrushing was continued until the mixes were too wet to handle. Testing was carried out so that the time for each step of each operation was substantially the same. The crushing strength was determined by breaking down the cylinders in a hydraulic press. Green strengths are recorded as total pounds on a 2 inch diameter Dietert cylinder, not in pounds per square inch crushing strength.

*Table I*

| Material, percent water | Portion 1 batch A (control) | Portion 2 batch A | Portion 1 batch B (control) | Portion 2 batch B |
|---|---|---|---|---|
| 3 | 129 | 103 | 126 | 115 |
| 5 | 135 | 162 | 157 | 110 |
| 7 | 35 | 164 | 182 | 107 |
| 9 | | 60 | 154 | 167 |
| 11 | | | 52 | 100 |

It will be noted that the batch B having a greater quantity of material of a particle size in the smaller particle size ranges shows higher strength in the absence of carboxymethylcellulose. Carboxymethylcellulose effects an improvement in the strength and water tolerance of both types of mixes.

For the purposes of this invention, the magnesite component of the gunning mixes may be made up of particles chosen from a single size range or by a mixture of material from two or more different size ranges. Mixtures of materials chosen from several size ranges are preferred because they are believed to compact to a denser final product.

Complete gunning mixes may have the following limits by weight:

| | Percent |
|---|---|
| Magnesite | 25–97 |
| Chrome ore | 0–70 |
| Chrome salts | 0–3 |
| Silicate binder | 1–5 |
| Cellulose carboxyether | 0.1–0.5 |

The following examples are given to more clearly illustrate the character of the invention, but with no intention to be limited thereto.

*Example I*

A dry refractory mixture suitable for deposit on the walls of a furnace by gun application was made as follows:

A dead-burned magnesite showing the chemical analysis

| | Percent |
|---|---|
| $SiO_2$ | 4.8 |
| $Fe_2O_3$ | 2.4 |
| $Al_2O_3$ | 1.3 |
| CaO | 4.0 |
| MgO | 87.4 |
| Ignition loss | 0.1 | was crushed and a mixture of particles prepared which showed 35% by weight of a particle size passing a No. 16 screen and retained on a No. 30 U.S. Standard screen and 61% by weight passing a No. 30 U.S. Standard screen.

To each 96 parts by weight of this magnesite material was added 3.8 parts by weight of sodium silicate of $Na_2O:SiO_2$ ratio 1:2.00 and 0.15 parts by weight of sodium salt of carboxymethylcellulose having a substitution of approximately 0.7 and a viscosity at 1% concentration and at 25° C. of between 1300 and 2200 centipoises. At the time of passage through the BRI gun, the powder mixture was mixed with approximately 12% by weight of water to provide a slight excess over the estimated requirement of 10% water so that evaporation prior to striking the wall did not reduce the water content below the desired amount.

The wetted mixture was propelled against the lining of a furnace to repair a slag line area. This lining at the time fo application was at a temperature of about 2100° F. The slag line area patch was an adherent layer substantially free of cracks.

*Example II*

A dead-burned magnesite of substantially the same chemical analysis as the magnesite of Example I was sized and reblended to give a mixture of particles which showed:

Burnt magnesite refractory:  Percent
Pass ⅛"—on #16 sieve _____ 44.8
Sized pass #16—on #30 sieve _____ 16
Pulverized (pass #30 to dust) _____ 35

To each 95.8 parts by weight of this magnesite material was added 4 parts by weight of sodium silicate and 0.2 parts by weight of sodium salt of carboxymethylcellulose having a substitution of approximately 0.7 and a viscosity at 1% concentration and at 25° C. of between 1300 and 2200 centipoises. At the time of passage through the BRI gun, the powder mixture was mixed with approximately 12% by weight of water to provide a slight excess over the estimated requirement of 10% so that evaporation prior to striking the wall did not reduce the water content below the desired amount.

The wetted mixture was propelled against the lining of a furnace to repair an area of cracked lining. This lining at the time of application was at a temperature of about 1700° F. The slag line area patch was an adherent layer substantially free of cracks.

*Example III*

A gunning mix suitable for patching a furnace lining was prepared from the magnesite whose chemical analysis was substantially the same as that in Example I.

40 parts by weight of particles of magnesite, 20 parts of which were of a particle size which passed a 1/8" screen and were retained on a No. 16 screen and 20 parts of which passed through a No. 16 screen and were retained on a No. 30 screen, was mixed with 56 parts by weight of chrome ore, of the analysis shown hereinbefore when discussing chrome ore and having a particle size such that substantially 100% of the ore passed through a No. 30 U.S. Standard screen.

To 96 parts by weight of dry mixture was added 3.85 parts by weight of potassium silicate and 0.15 parts by weight of sodium salts of carboxymethylcellulose.

The mixture was rendered uniform by tumbling in a revolving drum mixer. At the time of wetting in the BRI gun nozzle, approximately 14% by weight of water was added to the composition. The wetted mixture of composition was projected against the inside of a studded metal casting designed for use as a steel runner. After drying for about 24 hours to a temperature of about 1200° F., the deposited gunning mixture was then set sufficiently for service.

*Example IV*

A dead-burned magnesite of substantially the same chemical analysis as the magnesite of Example I was sized and reblended to give a mixture of particles which showed:

Burnt magnesite refractory: Percent
Pass 1/4"—on #8 sieve_____ 21.9
Pass #8—on #16 sieve_____ 19
Pass #16—on #30 sieve_____ 10
Pulverized (pass #30 to dust)_____ 44

To each 94.9 parts by weight of this magnesite material was added 4.5 parts by weight of sodium silicate and .6 parts by weight of sodium salt of carboxymethylcellulose having a substitution of approximately 0.7 and a viscosity at 1% concentration and at 25° C. of between 1300 and 2200 centipoises. At the time of passage through the BRI gun, the dry mixture was mixed with approximately 12% by weight of water to provide a slight excess over the estimated requirement of 10% so that a slightly soft mix would result. The wetted material was propelled into the void between an enlarged taphole of a steel producing open hearth furnace and a 6" diameter steel pipe (form) held in place by hand emplaced material at the end opposite the end to be gunned. The hole ranged from about 300° F. at the hand prepared end to a dull red heat on the end into which the gun material was introduced. The void was gunned full of the wetted mixture and this material and the pipe dressed with dolomite before charging the furnace. After 6 heats had been tapped through the new taphole, it showed some erosion, but was considered useable for a number of additional heats.

*Example V*

A gunning mix suitable for patching a furnace lining was prepared from the magnesite whose chemical analysis was substantially the same as that in Example I.

40 parts by weight of particles of magnesite which passed a 1/8" screen and were retained by a No. 16 screen, 27.7 parts by weight of a chrome ore, of the analysis shown hereinbefore when discussing chrome ore and having a particle size such that 100% of the ore passed a No. 8 U.S. sieve and was retained on a No. 30 U.S. sieve, and 30 parts by weight of a chrome ore of substantially the same analysis pulverized so that 100% passed a No. 30 U.S. sieve and approximately 70% passed a No. 100 U.S. sieve.

To 97.7 parts by weight of dry mixture was added 2.0 parts by weight of sodium silicate and 0.3 part by weight of sodium salt of carboxymethylcellulose.

The mixture was rendered uniform by tumbling in a revolving drum mixer. At the time of wetting in the BRI gun nozzle, approximately 12% by weight of water was added to the composition. The wetted mixture of composition was projected against the eroded slag line of an electric arc furnace. This lining, at the time of application, varied in temperature from approximately 1300° F. to 2100° F. The slag line area patch was an adherent layer substantially free from cracks.

We claim:

1. A magnesia refractory gunning composition consisting essentially of dead-burned magnesite particles, and between 1% and 5% of alkali metal silicate having an alkali metal oxide:silicon dioxide ratio in the range between about 1:1.5 and 1:3.5 and between 0.1% and 1% of water soluble cellulose carboxyether having a viscosity at 25° C. and at 1% concentration of between 1000 and 2800 centipoises.

2. A magnesia refractory gunning composition consisting essentially of dead-burned magnesite of a particle size such that the particles pass a 1/8 inch screen and a maximum of 40% passes a No. 100 U.S. Standard screen, between 1% and 5% of alkali metal silicate having an alkali metal oxide:silicon dioxide ratio in the range between about 1:1.5 and 1:3.5 and between 0.1% and 1% of water-soluble cellulose carboxyether having a viscosity at 25° C. and at 1% concentration of between 1000 and 2800 centipoises.

3. A magnesia refractory gunning composition consisting essentially of dead-burned magnesite particles, between 1% and 5% alkali metal silicate having an alkali metal oxide:silicon dioxide ratio in the range between about 1:1.5 and 1:3.5 and between 0.1% and 1% of cold-water soluble monovalent cation salt of carboxyalkylether having a viscosity at 25° C. and at 1% concentration of between 1000 and 2800 centipoises.

4. A magnesia refractory gunning composition consisting essentially of dead-burned magnesite particles, between 1% and 5% alkali metal silicate having an alkali metal oxide:silicon dioxide ratio in the range between about 1:1.5 and 1:3.5 and between 0.1% and 0.25% of cold-water soluble monovalent cation salt of carboxyalkylether having a viscosity at 25° C. and at 1% concentration of between 1000 and 2800 centipoises.

5. A magnesia refractory gunning composition consisting essentially of dead-burned magnesite particles, between 1% and 5% alkali metal silicate having an alkali metal oxide:silicon dioxide ratio in the range between about 1:1.5 and 1:3.5 and between 0.1 and 1% of alkali metal salt of carboxymethylcellulose having a viscosity at 25° C. and at 1% concentration of between 1000 and 2800 centipoises.

6. A magnesia refractory gunning composition consisting essentially of dead-burned magnesite particles, between 1% and 5% of alkali metal silicate having an alkali metal oxide:silicon dioxide ratio in the range between 1:1.5 and 1:3.5 and between 0.1% and 1% of water soluble cellulose carboxy ether.

7. A magnesia refractory gunning composition consisting essentially of dead-burned magnesite particles, between 1% and 5% of alkali metal silicate having an alkali metal oxide:silicon dioxide ratio in the range between 1:1.5 and 1:2.5 and between 0.1% and 1% of water soluble cellulose carboxy ether having a viscosity at 25° C. and at 1% concentration of between 1000 and 2800 centipoises.

8. A magnesia refractory gunning composition consisting essentially of dead-burned magnesite of a particle size such that the particles pass a ⅛ inch screen and a maximum of 40% passes a No. 100 U.S. Standard screen, chrome ore of a particle size such that 100% passes a No. 30 U.S. Standard screen, between 1% and 5% of alkali metal silicate having an alkali metal oxide:silicon dioxide ratio in the range between about 1:1.5 and 1:3.5 and between 0.1% and 1% of water soluble cellulose carboxyether having a viscosity at 25° C. and at 1% concentration of between 1000 and 2800 centipoises.

9. A magnesia refractory gunning composition which comprises comminuted dead-burned magnesite of a particle size such that 0–40% passes a ⅛ inch screen and is retained on a No. 16 U.S. Standard screen, 10–40% passes a No. 16 screen and is retained on a No. 30 screen, 10–40% passes a No. 30 screen and is retained on a No. 100 screen and 15–40% passes a No. 100 screen, between 1% and 5% of alkali metal silicate having an alkali metal oxide:silicon dioxide ratio in the range between about 1:1.5 and 1:3.5 and between 0.1% and 1% of water soluble cellulose carboxyether having a viscosity at 25° C. and at 1% concentration of between 1000 and 2800 centipoises.

10. A magnesia refractory gunning composition which comprises comminuted dead-burned magnesite of a particle size such that 45% passes a ⅛ inch screen and is retained on a No. 16 U.S. Standard screen, 16% passes a No. 16 screen and is retained on a No. 30 screen, 35% passes a No. 30 screen and, 3.8% sodium silicate and 0.2% of sodium salt of carboxymethylcellulose having a viscosity at 25° C. and at 1% concentration of between 1000 and 2800 centipoises.

11. A magnesia refractory gunning composition comprising about 50% of dead-burned magnesite of a particle size such that 100% passes a ⅛ inch screen and approximately 100% is retained upon a 30 mesh U.S. Standard screen, 45.8% by weight of chrome ore of a particle size 100% of which passes a No. 30 U.S. Standard screen, 3.85% of sodium silicate and 0.15% of sodium salt of carboxymethylcellulose having a viscosity at 25° C. and at 1% concentration of between 1000 and 2800 centipoises.

12. The method of improving water tolerance of substantially phosphorous-free refractory gunning compositions consisting essentially of dead-burned magnesite particles and alkali metal silicate binder, said method consisting in intimately admixing with such compositions 0.1% to 1% of cold water soluble cellulose carboxyether having a viscosity at 25° C. and at 1% concentration of between 1000 and 2800 centipoises.

13. The method of improving water tolerance of substantially phosphorous-free refractory gunning compositions consisting essentially of dead-burned magnesite particles and alkali metal silicate binder said method consisting in intimately admixing with such compositions between 0.1% and 1% of cold water soluble monovalent cation salt of carboxyalkylether having a viscosity at 25° C. and at 1% concentration of between 1000 and 2800 centipoises.

14. The method of improving water tolerance of substantially phosphorous-free refractory gunning compositions consisting essentially of dead-burned magnesite particles and alkali metal silicate binder said method consisting in intimately admixing with such compositions between 0.1% and 1% of cold water soluble alkali metal salt of carboxymethylcellulose having a viscosity at 25° C. and at 1% concentration of between 1000 and 2800 centipoises.

15. The method of making refractory repairs which comprises admixing primary refractory components consisting essentially of dead-burned magnesite and between 1% and 5% of alkali metal silicate binder with 0.1% to 1% of water soluble cellulose carboxyether having a viscosity at 25° C. and at 1% concentration of between 1000 and 2800 centipoises to form a substantially phosphorous-free gunning mixture, mixing the dry solids with between 8% and 15% of water on a weight of the dry solids basis in a spray gun and discharging the wetted mix against the desired portion on a refractory base, hardening the wetted mixture by drying at temperatures below firing temperatures and firing the same at temperatures up to 2100° F.

16. The method of making refractory repairs which comprises admixing primary refractory components consisting essentially of dead-burned magnesite and between 1% and 5% of alkali metal silicate binder with between 0.1% and 1% of water soluble alkali metal salt of carboxymethylcellulose having a viscosity at 25° C. and at 1% concentration of between 1000 and 2800 centipoises to form a substantially phosphorous-free gunning mixture, mixing the dry solids with between 8% and about 15% of water on a weight of the dry solids basis in a spray gun and discharging the wetted mix against the desired portion on a refractory base, hardening the wetted mixture by drying at temperatures below firing temperatures and firing the same at temperatures up to 2100° F.

17. The method of making refractory repairs which comprises admixing refractory components consisting essentially of dead-burned magnesite, chrome ore and between 1% and 5% of alkali metal silicate binder with between 0.1% and 1% of water soluble alkaline metal salt of carboxymethylcellulose having a viscosity at 25° C. and at 1% concentration of between 1000 and 2800 centipoises to form a substantially phosphorous-free gunning mixture, mixing the dry solids with between 8% and 15% of water on a weight of the dry solids basis in a spray gun and discharging the wetted mix against the desired portion on a refractory base, hardening the wetted mixture by drying at temperatures below firing temperatures and firing the same at temperatures up to 2100° F.

References Cited in the file of this patent

UNITED STATES PATENTS

| | | |
|---|---|---|
| 1,564,394 | Youngman | Dec. 8, 1925 |
| 1,994,377 | Williams | Mar. 12, 1935 |
| 2,316,229 | Berlek | Apr. 13, 1943 |
| 2,350,161 | Gloor | May 30, 1944 |
| 2,501,336 | Hyde | Mar. 21, 1950 |
| 2,628,915 | Austin | Feb. 17, 1953 |
| 2,852,402 | Shell | Sept. 16, 1958 |

OTHER REFERENCES

Hercules Powder Co., 1946 publication, "What Do You See in CMC" (pages 1–3).